Patented Aug. 3, 1954

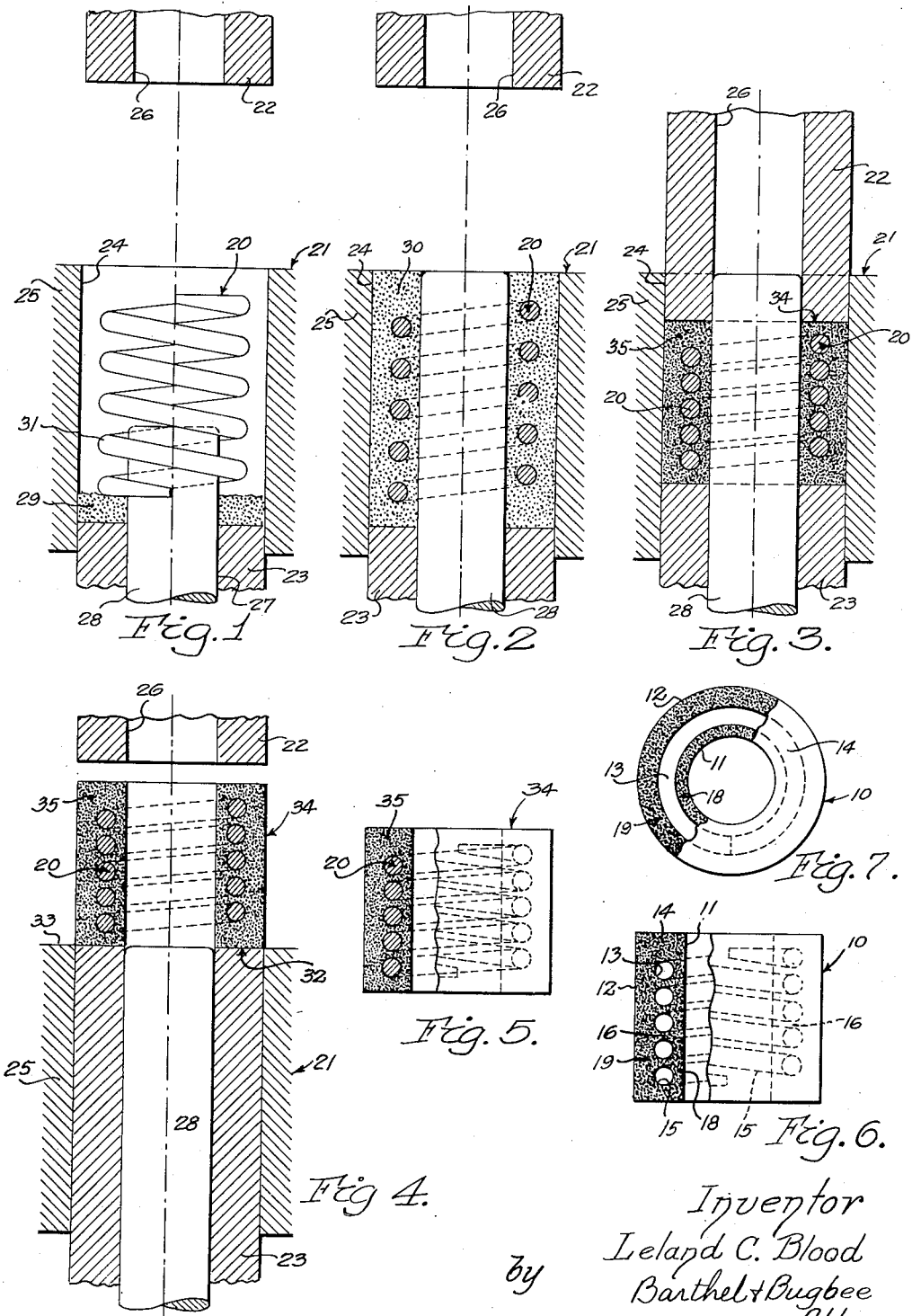

2,685,507

UNITED STATES PATENT OFFICE 2,685,507

PROCESS OF MAKING POROUS CHAMBERED BEARING

Leland C. Blood, Plymouth, Mich., assignor to Michigan Powdered Metal Products Co., Inc., Northville, Mich., a corporation of Michigan Original application March 18, 1949, Serial No. 82,243. Divided and this application March 31, 1950, Serial No. 153,203

1 Claim. (Cl. 75—214)

This invention relates to a process of producing bearings and, in particular, powdered metal bearings.

One object of this invention is to provide a process of making a bearing of porous material having a lubricant reservoir within the bearing wall encircling the bearing bore, this reservoir being of spiral or annular configuration with the intervals between the reservoir passageway convolutions forming reinforcements or bridge portions for strengthening the bearing.

Another object is to provide a process of making a bearing of porous material with an oil reservoir encircling the bearing bore wherein an increased density is imparted to the bearing because of the novel manner of shaping and using the core of infiltratable material employed in forming the oil reservoir of the bearing.

Another object is to provide a process of making a bearing of porous material with an oil reservoir encircling the bearing bore, wherein a helical core member of infiltratable material is embedded in the powdered material of which the bearing is composed prior to the molding operation, the spiral core member being partially collapsed during the molding operation along with the powdered bearing material so that not only is a greater and more uniform density obtained than with the use of a rigid core, but in addition, a much stronger bearing is obtained because of the fact that the lubricant reservoir is of spiral form with bearing material occurring between the separate convolutions of the reservoir, this bearing material reinforcing the bearing by forming bridge portions between the outer and inner portions of the bearing.

This is a division of my co-pending application Serial No. 82,243 filed March 18, 1949 for Porous Chambered Bearing and Process of Making the Same which on February 10, 1953 became U. S. Patent 2,628,138.

In the drawings:

Figure 1 is a central vertical section through the die cavity and plungers of a molding press, arranged for forming the bearing of the present invention and showing the die cavity partly filled, and with the reservoir core in position in the die cavity;

Figure 2 is a view similar to Figure 1, but showing a later stage in the molding operation wherein the die cavity has been completely filled with the powdered bearing material so as to completely embed the reservoir core therein;

Figure 3 is a view similar to Figure 1, but showing a still later stage in the molding operation wherein the powdered bearing material and the reservoir core have both been compressed by the press plungers to form the unsintered bearing;

Figure 4 is a view similar to Figure 1, but showing the final stage in the molding operation wherein the compressed unsintered bearing has been ejected from the mold cavity;

Figure 5 is a side elevation, partly in central vertical section, of the unsintered bearing after its ejection from a mold;

Figure 6 is a view similar to Figure 5, but showing the bearing after sintering, wherein the reservoir core has disappeared by infiltration into the bearing material, leaving a hollow lubricant reservoir in the bearing wall; and Figure 7 is a top plan view, partly in horizontal section, of the bearing shown in Figure 6.

In the manufacture of powdered metal bearings having reserve lubricant reservoirs in the bearing wall, as disclosed and claimed in the Haller application, Serial No. 81,274, filed March 14, 1949, now Patent No. 2,625,452, for Porous Bearing with Lubricant Reservoir Therein, wherein it is stated that "the quantity of metal powder and the extent of compression are so regulated that the desired porosity is obtained" and that "a porosity of about 18% is satisfactory" it has also been found that an increased density is desirable, as well as a strengthening of the bearing wall adjacent the bearing bore in order to increase the adaptability of the bearing to heavy duty operation under severe loads. In the above-mentioned Haller application, which employs a rigid reservoir core of material which is infiltratable into the powdered bearing metal during the sintering operation, experience has shown that the attainable density of the bearing metal is limited because of the resistance of the core to slippage as the powdered bearing metal is compressed in the mold cavity of the molding press. It is also deemed desirable to provide bridge portions across the reservoir in order to strengthen the inner wall of the bearing adjacent the bearing bore, particularly where the inner bearing wall has become relatively thin.

The porous bearing and process of making it according to the present invention solve these problems and provide a superior bearing of increased density and with a lubricant reservoir in the form of passageways either spiral or annular encircling the bearing bore and separated from one another by intervals filled with the powdered bearing metal so as to form bridge portions or reinforcements between the outer and inner bearing walls. Furthermore, the preferred process of making the bearing of the present invention employs a helical reservoir core of material which is infiltratable into the bearing wall during sintering, this helical core being partially collapsed in an axial direction during the molding operation, along with the powdered metal or other bearing material, so that the core, after the compression of the bearing material around it, has its convolutions closer together than at the start of the molding operation. Consequently, the helical reservoir core yields in this manner as the powdered bearing material is compressed during the molding operation, thereby enabling an increased density to be obtained between the convolutions, and a more uniform density obtained throughout the bearing. Moreover, when the bearing thus formed is sintered, the core material infiltrates into the powdered bearing material, thereby disappearing and leaving the lubricant reservoir in the form of a helical or annular passageway or passageways encircling the bearing bore and separated from one another by intervals filled with bearing material forming bridge portions interconnecting the inner and outer bearing portions. These bridge portions greatly strengthen the bearing and, in cooperation with the increased density obtainable by the present invention, adapt it to heavier loads and longer life than have been hitherto obtainable.

Referring to the drawings in detail, Figure 6 shows a bearing generally designated 10 of hollow cylindrical form having a bearing bore 11 and an outer surface 12 and with an oil chamber or oil reservoir 13 of helical form located within the side wall 14 of the bearing and encircling the bearing bore 11. The individual convolutions 15 of the oil chamber or reservoir 13 are separated from one another by intervals 16 forming bridge portions which interconnect the inner and outer portions 18 and 19. These bridge portions 16 strengthen the bearing and adapt it to heavier loads than a bearing not provided with such reinforcements.

In the process of making the bearing 10 shown in Figures 6 and 7 a reservoir or chamber core 20 is prepared from material which is infiltratable into the powdered material of which the bearing is composed. In order to avoid completely filling up and clogging the pores of the bearing 10, the total volume of the impregnating metal core 20 must of course be less than the total volume of the pores in the body of the bearing 10, the porosity being a function of the density of compression and quantity of powdered metal, as stated above and as set forth in standard texts on powder metallurgy such as in the book "A Treatise on Powder Metallurgy" by Claus G. Goetzel, published in three volumes in 1949 by Interscience. As the volume of oil well and therefore the size of core sufficient to keep the bearing well lubricated for the expected life of the machine are relatively small in proportion to the volume of a bearing body of the usual commercial densities such as the above-mentioned porosity of 18%, no problem of seriously clogging the pores thereof with the core metal has been found to arise in actual practice of the present invention. For a powdered iron bearing, for example, the core 20 may be made of an alloy of approximately 85% copper and 15% zinc. This may be used to form the core 20 either in solid form or in the form of a sintered core of powdered copper and zinc, as desired. The core 20 is preferably formed in helical shape (Figure 1) resembling a helical spring in appearance. The bearing is molded in any suitable molding press, such as for example, the press disclosed and claimed in the co-pending application of John Haller, Serial No. 780,851, filed October 20, 1947 for Briquetting Machine which on September 2, 1952 became U. S. Patent 2,608,826. The molding press, generally designated 21, includes upper and lower tubular plungers 22 and 23 reciprocable in a bore or die cavity 24 in the die 25 mounted on the press bed (not shown). The hollow plungers 22 and 23 are provided with bores 26 and 27 respectively through which a central plunger or core rod 28 is independently reciprocable. The central plunger 28 forms the central bore 11 in the bearing 10.

In the molding operation, the lower plunger 23 and central plunger 28 are moved upward to suitable levels in the die cavity 24 (Figure 1). A small quantity of the powdered bearing material is then placed in the die cavity 24 above the lower plunger 23 and around the central plunger 27. This powdered material forms a layer 29 of such thickness that when it is compressed by the pressing operation, it forms a wall of the desired thickness between the first individual convolution 15 of the chamber or reservoir 13 and the end of the bearing. The bottom of the helical core 20 is then placed on the top surface of this layer 29 of powdered material (Figure 1) with its convolutions 31 encircling the central plunger 28. With the helical core 20 thus placed in position, and the central plunger 28 raised to the top of the die cavity 24 (Figure 2), the remainder of the die cavity 24 is then filled with the full charge 30 of powdered material surrounding the central plunger 28 and the convolutions 31 of the core 20.

With the die cavity 24 thus filled with the powdered bearing material, such as powdered iron, and the core 20 completely embedded therein (Figure 2) the upper plunger 22 of the molding press 21 is then moved downward into the die cavity 24 (Figure 3) while the lower plunger 23 is moved upward toward it, compressing the charge of powdered material between them. As the particles of powdered material move toward one another into a more densely packed condition, the convolutions 31 of the helical core 20 also move toward one another, thus giving the effect of compressing a helical spring. At the same time, the particles of powdered material readjust themselves freely around the convolutions 31 into a state of densely packed equilibrium, yet there remains a helical layer of particles between the convolutions 31, thereby bridging the inner and outer portions of the partially finished bearings thus formed.

When the compression of the powdered material has been completed, the upper plunger 22 is raised clear of the compressed article while the latter is ejected from the die cavity 24 by moving the lower plunger 23 upward so that its top surface 32 is level with the top surface 33 of the die 25, whereupon the unsintered partially finished bearing 34 is removed from the molding press 21 with the compressed helical core 20 firmly embedded in it (Figure 5).

The semi-finished bearing 34 is now placed in a sintering oven and sintered at the temperature most appropriate for the size of the bearing and the materials of which it and the core 20 are composed. Sintering should be conducted at a temperature higher than the melting point of the core 20 and lower than the melting point of the bearing 10 and for a time sufficient to melt and infiltrate the core metal into the pores of the bearing 10. This time naturally varies with the size of the core and density of the bearing body and is easily found by experiment for the particular size and density chosen. In using powdered iron for the bearing and the previously-mentioned copper-zinc alloy for the core 20, a sintering temperature of 2020° F. for about one-half hour has been found satisfactory. During the sintering operation, the material composing the core 20 becomes fluid and infiltrates the pores of the semi-finished bearing wall 35, leaving a hollow chamber or passageway 13 in the space previously occupied by the core 20 (Figure 7), thereby forming the bearing 10. The sintering not only increases the hardness of the bearing, but the infiltration material still further increases the hardness and durability over that possessed by a sintered bearing lacking such infiltrated material. In the interval between each pair of the convolutions 15 of the chamber or passageway 13, there now exists the bridge-like layer 16 interconnecting the inner and outer portions 18 and 19 of the bearing 10, these layers or bridge portions 16 greatly strengthening the bearing and increasing its load-carrying capacity. In infiltrating, however, the core material does not seriously clog the pores of the bearing 10.

The sintered bearing 10 is now filled with oil in one of several possible ways, the simplest way being to place the bearing in a bath of heated lubricating oil of the type and viscosity desired in the final bearing. For certain types of bearings, for example, it has been found satisfactory to immerse the bearing for 20 minutes to half an hour in an oil bath heated to a temperature of 180° F. While the bearing is in this bath, the air in its pores and in the chamber or passageway 13 which is to form the oil reservoir bubbles out through the pores and is expelled. The oil then moves in through the pores to take the place of the air thus expelled. The filling may be accelerated by quickly removing the bearings from the hot oil after bubbling has ceased, and plunging it into a bath of cool lubrication oil at preferably room temperature or below. This action speeds up the passage of the oil into the pores and reservoir 13.

In this manner, the bearing is charged with a supply of lubricating oil which not only fills the pores but also the reservoir 13, the latter thereby holding a reserve supply of oil which passes through the pores of the inner bearing portion 18 to the bearing bore 11 and lubricates the rotating element, such as a shaft, which is journaled therein. As rapidly as the oil is used up during the operation of the machine in which the bearing is mounted, other oil seeps through the pores and takes its place. The bearing thus has a much greater supply of oil than the ordinary porous bearing not possessing such a reservoir, and this supply of oil is ordinarily sufficient to last the life of the bearing. It is, however, possible to recharge the bearing with oil by repeating the foregoing procedure.

Optionally, instead of heating or boiling the bearing in oil, it may be placed in an oil bath in a vacuum tank which is then evacuated. The evacuation of the tank causes the air to be drawn out from the passageway 13 through the pores of the bearing, creating a vacuum in this space. When the air is again admitted to the tank above the oil bath, atmospheric pressure, aided by capillary attraction and osmosis, causes the oil to enter the space vacated by the air and to fill not only the pores but also the passageway or chamber 13 forming the oil reservoir. In the use of either method of charging the bearing with lubricating oil, the quantity of oil entering the bearing may easily be found by weighing the bearing before and after charging it. The use of the collapsible helical core 20 may be modified by winding the alloy wire loosely around the central plunger 28 instead of preforming it. The effect of the helical core may be obtained to a lesser extent by using rings of the infiltratable core material which are embedded in the mold cavity 24 at spaced intervals as the mold cavity is filled with the powdered material. The helical core 20, however, gives a continuous reservoir, all portions of which are directly interconnected and which continuously encircles the bearing bore 11 through almost its entire length.

The bearing 10 made of the present invention and made by the present process can be used after sintering for a cheap bearing or for light duty. For precision bearings or heavy duty bearings, the bearing can be carburized in order to harden it, and the bearing can also be ground on both its inner and outer surfaces 11 and 12.

It will be understood that the word "metal" is used in the accompanying claims includes alloys of metals.

What I claim is:

A process of making a chambered bearing comprising preparing an approximately helical core of metal infiltratable into the pores between the powdered metal particles of which the bearing is to be made, embedding said core in a mass of said powdered bearing metal particles, compressing said mass of powdered metal around said core into a bearing body of predetermined shape, forcibly moving the convolutions of said collapsed core closer together in an axial direction than their initial spacing while compressing said mass around said core, said core having a volume less than the total volume of the pores between the particles in said compressed mass of powdered metal, and sintering the body at a temperature above the melting point of the core metal but below the melting point of the powdered metal of the body whereby to infiltrate the pores of said body with the core metal and form an approximately helical chamber therein while obtaining an approximately uniform density throughout said body.

References Cited in the file of this patent

UNITED STATES PATENTS

| Number | Name | Date |
| --- | --- | --- |
| 1,556,658 | Williams | Oct. 13, 1925 |
| 2,180,988 | Lemmers et al. | Nov. 21, 1939 |
| 2,227,308 | Hildabolt | Dec. 31, 1940 |
| 2,364,713 | Hensel | Dec. 12, 1944 |
| 2,402,950 | Culver et al. | July 2, 1946 |
| 2,561,579 | Lenel | July 24, 1951 |

FOREIGN PATENTS

| Number | Country | Date |
| --- | --- | --- |
| 452,503 | Great Britain | Aug. 17, 1936 |
| 573,740 | Great Britain | Dec. 4, 1945 |
| 611,466 | Great Britain | Oct. 29, 1948 |